C. AALBORG.
TROLLEY HANGER AND CLAMP.
APPLICATION FILED SEPT. 9, 1907.

931,366.

Patented Aug. 17, 1909.

WITNESSES:
Fred H. Miller
R. H. Zearborn

INVENTOR
Christian Aalborg
BY
Wesley L. Carr
ATTORNEY

UNITED STATES PATENT OFFICE.

CHRISTIAN AALBORG, OF WILKINSBURG, PENNSYLVANIA, ASSIGNOR TO WESTINGHOUSE ELECTRIC & MANUFACTURING COMPANY, A CORPORATION OF PENNSYLVANIA.

TROLLEY HANGER AND CLAMP.

No. 931,366.     Specification of Letters Patent.     Patented Aug. 17, 1909.

Application filed September 9, 1907. Serial No. 392,046.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Trolley Hangers and Clamps, of which the following is a specification.

My invention relates to means for supporting electric line conductors and it has for its object to provide an improved clamping device whereby a trolley conductor may be simply and durably secured to a suitable support.

My improved clamping device is specially adapted for use with grooved trolley conductors that are suspended from messenger wires or cables but its use is not limited in this regard and it may be employed in connection with conductors of circular cross section that are supported from bracket arms or cross wires, in accordance with a well known practice for low potential lines.

Figure 1:
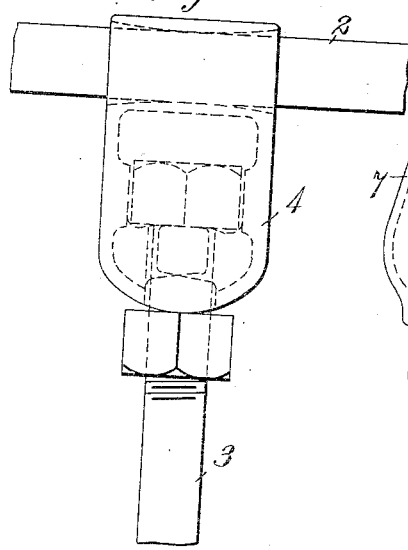
Figure 2:
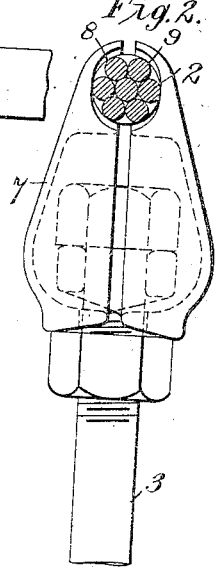
Figure 3:
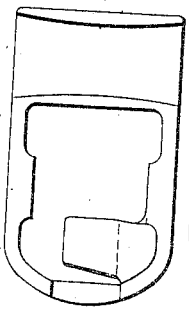
Figure 4:
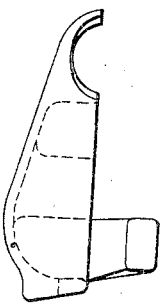
Figure 5:
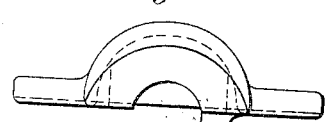
Figure 6:
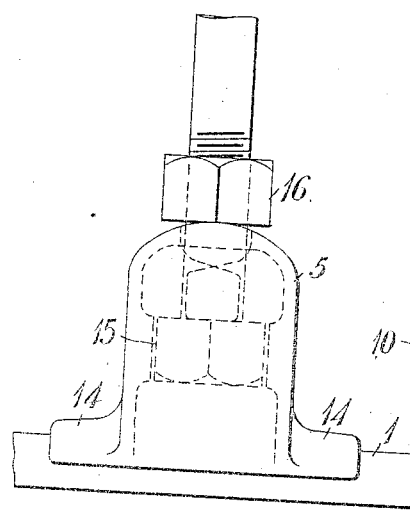
Figure 6:
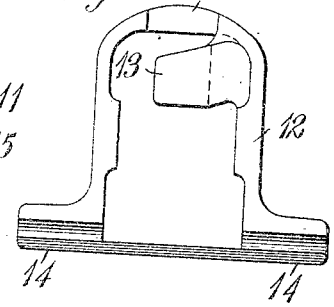

Figure 1, of the accompanying drawings, is a front elevation and Fig. 2 is an end elevation of a trolley hanger and clamp constructed in accordance with my invention. Figs. 3, 4, 5, and 6 are detail views of the clamps shown in Figs. 1 and 2.

Referring to the drawings, a trolley conductor 1 is suspended from a messenger wire or cable 2 by means of a hanger rod 3, a cable clamp 4 and a trolley clamp 5. The cable clamp 4 and the trolley clamp 5 are substantially alike except that the trolley clamp is provided with hook projections that are adapted to engage the grooves 6 in the trolley conductor 1 while the cable clamp 4 is provided with recesses which are adapted to receive the cable 2, consequently, only one of these parts will be described in detail. The cable clamp 4 comprises two interchangeable halves 7 having complementary recesses 8 and 9 in which the cable 2 may be secured, the hanger rod 3 being attached to the cable clamp 4 at one end and to the trolley clamp 5 at the other. The trolley clamp 5 comprises two interchangeable clamping portions 10 and 11 having hollow body members 12 into which segmental ring projections 13 extend, lateral projections 14 of hook-shape in cross section so that they are adapted to engage grooves 6 in the trolley conductor 1 and set nuts 15 and 16 which produce the desired clamping action between the two parts and serve to secure the clamp to the hanger rod. The upper extremities of the body portions 12 form an opening 17 through which the hanger rod 3 projects and the projections 13 are so arranged as to form complementary sleeve segments to receive the rod without interfering with each other. Below the sleeve thus formed, the rod is provided with the set nut 15 and outside the body 12 of the clamp it is provided with the set nut 16. The surfaces of the clamping members which are engaged by the set nuts are so beveled that a clamping action is produced between the projections 14 when the set nuts are forced toward each other.

It will be observed that the total length of the hanger may be adjusted to some extent, since the rod 3 is threaded for a material distance from each end and, in practice, this feature is convenient and desirable. Furthermore, the trolley wire may be disengaged from its clamp without disturbing the connection between the hanger and the messenger cable.

Since variations in the size and arrangement of parts may be effected within the scope of my invention, I desire that only such limitations shall be imposed as are indicated in the appended claims.

I claim as my invention:

1. A hanger for wires or cables comprising a rod, two interchangeable complementary jaw members having hollow body portions and segmental sleeve projections each of which extends into the hollow body portion of the other member, thereby forming a sleeve through which the rod projects, and set nuts mounted on the rod at the respective ends of the sleeve.

2. A hanger for wires or cables comprising a rod, two interchangeable complementary jaw members having laterally extending hook projections adapted to engage a grooved conductor and hollow body portions, segmental sleeve projections each of which extends into the hollow body portion of the other member, thereby forming a sleeve through which the rod projects, and set nuts mounted on the rod at the respective ends of the sleeve, the end surfaces of the sleeve being so beveled that a clamping action is produced between the jaw members when the set nuts are forced toward each other.

3. A hanger comprising a rod, two complementary members having hollow body portions and jaws and provided with segmental sleeve projections which extend into the opposing hollow body portions and constitute a sleeve to embrace the rod, and means coöperating with the rod to force the jaws toward each other.

4. A hanger comprising a rod, two complementary members having hollow body portions and jaws and provided with segmental sleeve projections to embrace the rod, and means coöperating with the rod to force the jaws toward each other.

5. A hanger comprising a rod, two complementary members having hollow body portions provided with jaws and inwardly inclined surfaces at their respective ends and intermediate segmental sleeve projections which embrace said rod, and an adjustable nut to engage said inclined surface and force the jaws toward each other.

6. A hanger comprising a rod having a nut at one end, two complementary members having hollow body portions to embrace said nut and provided with jaws and segmental sleeve projections between which said nut is located, and a nut adjustably mounted on said rod to engage said body portions and force said jaws toward each other.

7. A hanger comprising a rod having screw-threaded ends, two nuts mounted upon each end, two pairs of complementary members having hollow body portions provided with jaws, inwardly inclined ends and segmental sleeve projections, said sleeve projections being so disposed as to embrace the rod between its nuts.

8. A hanger comprising a rod having a screw-threaded end, two nuts mounted upon said end, two complementary members having hollow body portions provided with jaws and inwardly inclined surfaces at their respective ends and with intermediate segmental sleeve projections to embrace the rod between the nuts.

9. A hanger comprising a rod having nuts upon its ends, two complementary members at each end having hollow body portions provided with jaws and segmental sleeve projections, and means coöperating with the rod to force each pair of jaws toward each other.

In testimony whereof, I have hereunto subscribed my name this 29 day of August, 1907.

CHRISTIAN AALBORG.

Witnesses:
 FRANK CONRAD,
 BIRNEY HINES.